Aug. 11, 1931.   G. T. R. HILL   1,818,891
UNDERCARRIAGE FOR AIRCRAFT
Filed Jan. 9, 1931   3 Sheets-Sheet 2
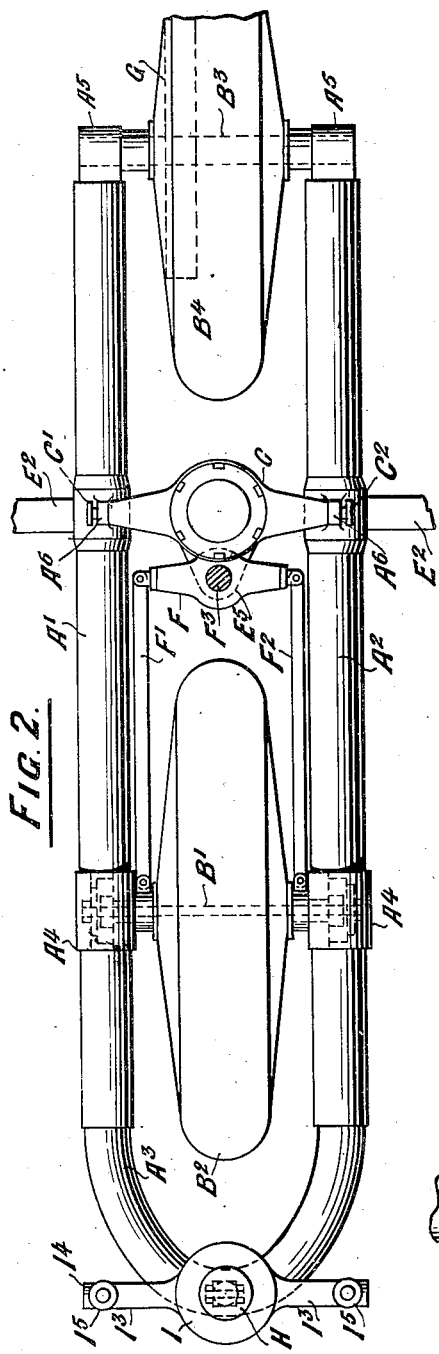
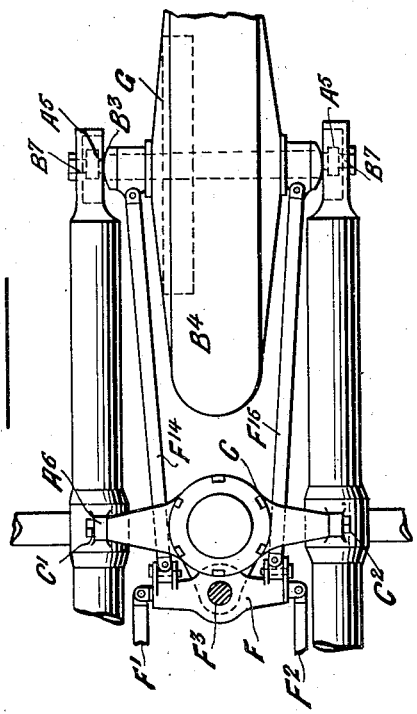
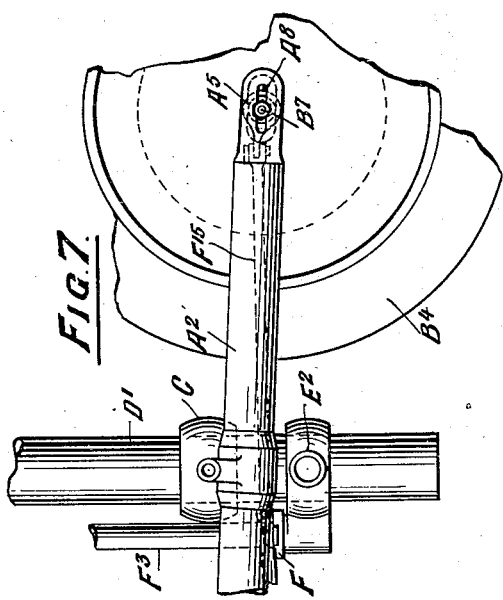

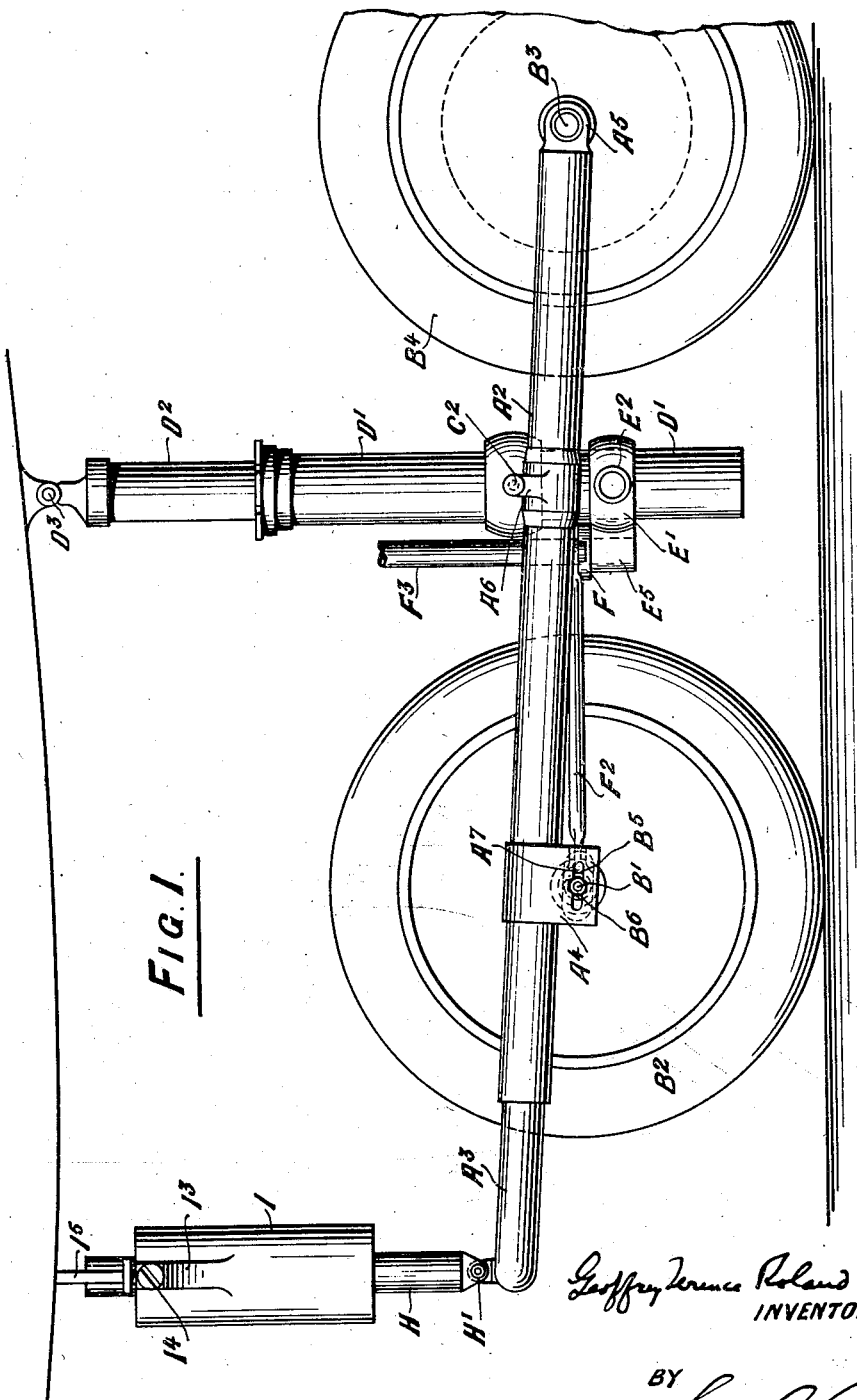

Aug. 11, 1931.  G. T. R. HILL  1,818,891
UNDERCARRIAGE FOR AIRCRAFT
Filed Jan. 9, 1931  3 Sheets-Sheet 3
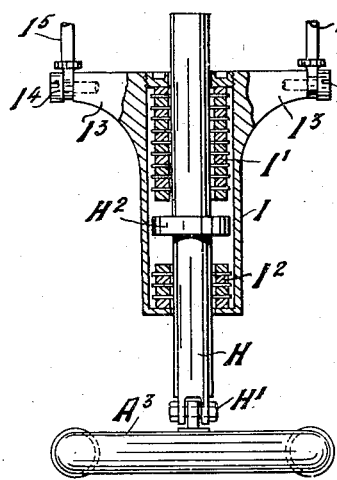
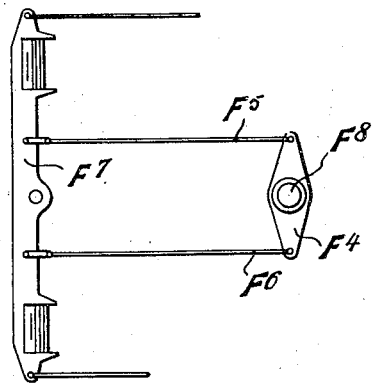
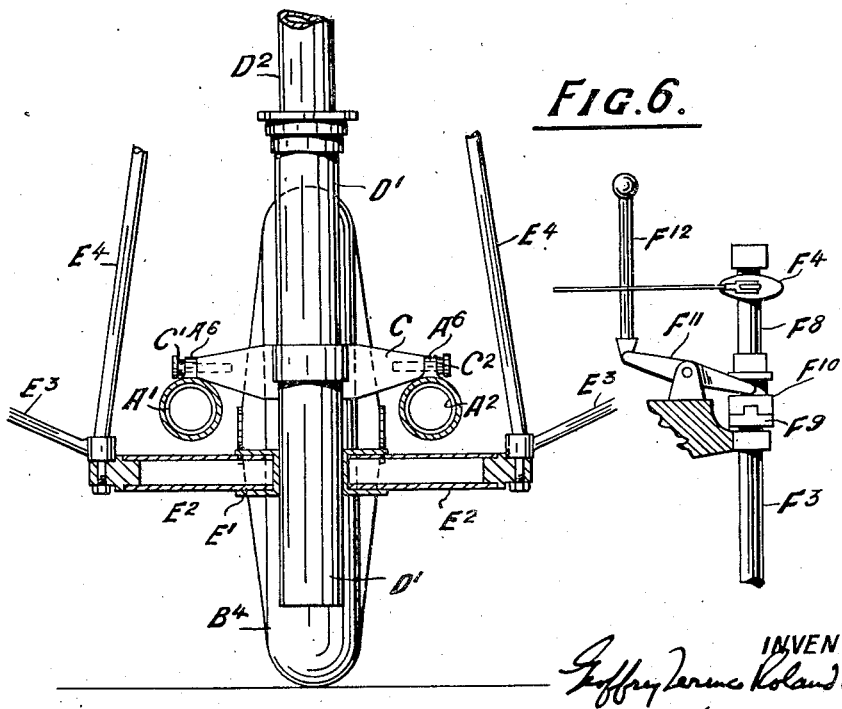
INVENTOR
Geoffrey Terence Roland Hill
BY
ATTORNEY Patented Aug. 11, 1931

1,818,891

UNITED STATES PATENT OFFICE

GEOFFREY TERENCE ROLAND HILL, OF YEOVIL, ENGLAND, ASSIGNOR TO PETTERS LIMITED, OF YEOVIL, SOMERSET, ENGLAND

UNDERCARRIAGE FOR AIRCRAFT

Application filed January 9, 1931, Serial No. 507,736, and in Great Britain January 15, 1930.

This invention relates to undercarriages for aircraft, the object being to provide means whereby the "take-off" and landing of aircraft may be effected with less stress to the aircraft structure and the pilot may be afforded more control in direction of travel and reduction in speed.

To this end, an undercarriage for aircraft, in which two wheels are arranged in tandem in a longitudinal frame which is connected to the aircraft on a lateral axis between said wheels so as to permit of a rocking movement, is provided with means adapted to permit angular adjustment of one of said wheels in said frame and means for angularly adjusting said wheel to steer said frame. A single undercarriage so arranged is provided on the aircraft, the wheels being located fore and aft in relation to the aircraft and the forewheel being angularly adjustable for the purpose of steering the aircraft.

The longitudinal frame may be connected to the aircraft through a crosshead having trunnion ends about which the longitudinal frame is pivotally mounted. The crosshead may have an elastic connection between itself and the body of the aircraft. The crosshead may be connected to the aircraft by a connecting member which is pivotally mounted at its upper end on the aircraft, and depends from said aircraft to serve as a guide for the crosshead and which connecting member is stayed from the aircraft at a point distant from its pivotal mounting. The connecting member may be made in two parts telescopically mounted one within the other, the upper part being fixed to the aircraft while the lower part is fixed to the crosshead and is slidably mounted in a guide stayed from the aircraft.

One of the wheels, preferably the fore wheel, is arranged to be steered to right and left by the pilot in operating his rudder control. Both wheels may, however, be arranged to be steered. In either case, means is provided for releasing the rudder control should undercarriage trouble interfere with the rudder control after taking off.

The invention will now be described with reference to the embodiments shown in the accompanying drawings, in which:—

Fig. 1 is an elevation of the undercarriage.
Fig. 2 is a plan view.
Fig. 3 is a cross-sectional view on the line 3—3 in Fig. 1, and showing the means for connecting the longitudinal frame to the aircraft body.
Fig. 4 is an end elevation partly in section on the line 4—4 in Fig. 1, and showing the means for resiliently checking the rocking movement of the longitudinal frame.
Fig. 5 illustrates diagrammatically in plan view the rudder control showing the connections for steering one of the undercarriage wheels.
Fig. 6 illustrates diagrammatically in elevation the rudder control and connections shown in Fig. 5.
Fig. 7 is a view showing a fragment of Fig. 1 illustrating the addition of means for steering the aft wheel.
Fig. 8 is a plan view of the arrangement shown in Fig. 7.

In the embodiment shown in Figs. 1–6, the longitudinal frame is composed of two longitudinal parallel side members $A^1$ $A^2$ connected by an arcuate front member $A^3$. On this frame, bearings $A^4$ are provided for the axle $B^1$ of the fore wheel $B^2$, and bearings $A^5$ for the axle $B^3$ of the aft wheel $B^4$. The chief support to the aircraft body is provided with a crosshead C having trunnion ends $C^1$ $C^2$ for trunnion bearings $A^6$ on the longitudinal frame by which said frame is pivotally mounted about said trunnion ends $C^1$ and $C^2$.

The crosshead is fixed to the lower part $D^1$ of an oleo strut which extends upwardly and telescopically receives the upper part $D^2$ which is provided at its upper end with a pivotal mounting $D^3$ by which it can be pivoted on the aircraft body. The lower part $D^1$ of the oleo strut is slidably mounted in a guide $E^1$ having lateral extensions $E^2$ by which it is stayed to the aircraft through the struts $E^3$ and struts $E^4$, the struts $E^3$ passing to the wings and the struts $E^4$ passing to the aircraft body. The guide member $E^1$ is provided with a lug $E^5$ forming a support for an oscillating yoke F which by means of the rods $F^1$ $F^2$ connects to the axle $B^1$ of the fore wheel. The axle $B^1$ has its bearings $B^5$ formed with an extension $B^6$ slidably mounted in the slot $A^7$ in the bearings $A^4$ of the longitudinal frame. The fore wheel bearings are in this way afforded fore and aft movement in order to permit the oscillating yoke F and rods $F^1$ $F^2$ to steer the fore wheel $B^2$ to the right and left. The oscillating yoke F is connected, by a steering column $F^3$ rising into the aircraft body, to an upper yoke $F^4$ (Figs. 5 and 6), which upper yoke is connected by wires $F^5$ $F^6$ to the rudder bar $F^7$ of the aircraft. The lower end of the steering column extends into a hole in the lug $E^5$ and forms a pivot about which the oscillating yoke F turns. In order to permit of the immediate release of the fore wheel $B^2$ from the flying rudder control should undercarriage trouble interfere with the rudder control after taking off, and thus safeguard non-interference with the control of the machine during flight, the upper part $F^8$ of the steering column carrying the upper yoke $F^4$ is made separately from the lower part $F^3$ and a quick release device in the form of a dog clutch, shown in Fig. 6, is interposed in this mechanism connecting the steering column $F^3$ to the rudder control, this dog clutch having a part $F^9$ fixed on the steering column $F^3$ and having a slidable part $F^{10}$ fixed on the upper part $F^8$ and adapted normally to engage the fixed part $F^9$, but to be movable by the lever $F^{11}$ and handle $F^{12}$ out of engagement with the fixed part $F^9$ to effect the required release.

The aft wheel is provided with a brake G, indicated by the dotted lines, provided with any usual brake operating mechanism which can be operated from the aircraft.

At the front end of the longitudinal frame is mounted a cushioning device or bumper to restrain excessive oscillation of said frame. This cushioning device comprises a plunger H pivotally mounted at $H^1$ by its lower end to the longitudinal frame and having intermediate its ends an enlargement $H^2$. This plunger is mounted in a casing I containing resilient elements $I^1$ and $I^2$, one mounted above and the other below the enlargement $H^2$. A small space is left between the enlargement $H^2$ on the plunger and the resilient elements in order that the frame may partake of a small amount of oscillatory movement before the resilient elements are brought into action to restrain the oscillatory movements of the frame. The casing I is formed at its upper end with laterally extending lugs $I^3$ on the end of each of which is pivotally mounted at $I^4$ a strut $I^5$ by which said casing is connected at two laterally spaced points to the aircraft body.

Instead of mounting the connection at the front of the longitudinal frame as a cushioning device or bumper, this may be made as a single connecting member adapted rigidly to check the rocking movement of said frame.

Alternatively, instead of mounting the fore steering wheel $B^2$ in the manner hereinbefore described and illustrated on the drawings, this wheel may be carried on a fork attached or connected to the steering column.

As shown in Figs. 7 and 8, the bearing $A^5$ for the axle $B^3$ of the aft wheel $B^4$ is formed with extensions $B^7$ slidably mounted in a slot $A^8$ in the bearing $A^5$ of the longitudinal frame. The aft wheel bearings are in this way afforded fore and aft movement. The oscillating yoke F is connected to the axle $B^3$ of the aft wheel $B^4$ by means of rods $F^4$ and $F^5$. In this manner the fore and aft wheels are angularly adjusted in the longitudinal frame in unison for the purpose of steering the aircraft.

It has been found that two wheels so arranged in tandem on aircraft of the pterodactyl type with swept-back wings, have been sufficient to maintain good balance during the take-off, but it is possible in larger machines that tandem wheels in duplicate may advantageously be employed, in which case two longitudinal frames might be employed side by side at a suitable distance apart; or a single frame might be employed with two steering wheels forward and two non-steering wheels at the back. The two steering wheels in such a construction would, of course, be adjusted in unison simultaneously.

In either construction, the elastic connections between the undercarriage and the aircraft structure, may be dispensed with if pneumatic tire wheels of large size and great elasticity are employed.

What I claim as my invention and desire to secure by Letters Patent is:—

1. Undercarriage for aircraft comprising two wheels arranged in tandem, a longitudinal frame carrying said wheels, means adapted to permit angular adjustment of one of said wheels in said frame, means for angularly adjusting said adjustable wheel to steer said frame, and means for connecting said frame to the aircraft on a lateral axis located between said wheels, such axis being adapted to permit of a rocking movement of said frame.

2. Undercarriage for aircraft comprising two wheels arranged in tandem, a longitudinal frame carrying said wheels, means adapted to permit angular adjustment of one of said wheels in said frame, means for angularly adjusting said adjustable wheel to steer said frame, means for connecting said frame to the aircraft on a lateral axis located between said wheels, such axis being adapted to permit of a rocking movement of said frame, and means distant from said lateral axis adapted resiliently to check the rocking movement of said frame.

3. Undercarriage for aircraft comprising two wheels arranged in tandem, a longitudinal frame carrying said wheels, means adapted to permit angular adjustment of one of said wheels in said frame, steering means for angularly adjusting said adjustable wheel to steer said frame, means adapted to couple said steering means to aircraft rudder control mechanism, and means for connecting said frame to the aircraft on a lateral axis located between said wheels, such axis being adapted to permit of a rocking movement of said frame.

4. Undercarriage for aircraft comprising two wheels arranged in tandem, a longitudinal frame carrying said wheels, means adapted to permit angular adjustment of one of said wheels in said frame, steering means for angularly adjusting said adjustable wheel to steer said frame, a coupling adapted to couple said steering means to aircraft rudder control mechanism, means for disengaging said coupling, and means for connecting said frame to the aircraft on a lateral axis located between said wheels, such axis being adapted to permit of a rocking movement of said frame.

5. Undercarriage for aircraft comprising two wheels arranged in tandem, a longitudinal frame carrying said wheels, means adapted to permit angular adjustment of one of said wheels in said frame, means for angularly adjusting said adjustable wheel to steer said frame, bearings on a lateral axis located between said wheels, a crosshead having trunnion ends engaging in said bearings and adapted to permit of a rocking movement of said frame, a connecting member supporting said crosshead, means for pivotally mounting said connecting member at its upper end to the aircraft and means for staying said connecting member.

6. Undercarriage for aircraft comprising two wheels arranged in tandem, a longitudinal frame carrying said wheels, means adapted to permit angular adjustment of one of said wheels in said frame, means for angularly adjusting said adjustable wheel to steer said frame, bearings on a lateral axis located between said wheels, a crosshead having trunnion ends engaging in said bearings and adapted to permit of a rocking movement of said frame, a connecting member having upper and lower parts mounted to telescope one within the other, said lower part supporting said crosshead, means for pivotally mounting the upper part of said connecting member at its upper end to the aircraft, means for staying said connecting member, and means for resiliently restraining telescopic movement of said upper and lower parts.

7. Undercarriage for aircraft comprising two wheels arranged in tandem, a longitudinal frame carrying said wheels, means adapted to permit angular adjustment of one of said wheels in said frame, means for angularly adjusting said adjustable wheel to steer said frame, bearings on a lateral axis located between said wheels, a crosshead having trunnion ends engaging in said bearings and adapted to permit of a rocking movement of said frame, a connecting member having upper and lower parts mounted to telescope one within the other, said lower part being fixed to said crosshead, means for pivotally mounting the upper part of said connecting member at its upper end to the aircraft, means for guiding the lower part of said connecting member, and means for resiliently restraining telescopic movement of said upper and lower parts.

8. In combination, an aeroplane, means connecting an undercarriage to said aeroplane, an undercarriage frame mounted on said means and adapted to rock on a lateral axis on said means, two wheels mounted in tandem fore and aft in said frame, means adapted to permit angular adjustment of said fore wheel, and means for angularly adjusting said fore wheel to steer said aeroplane.

9. In combination, an aeroplane, means connecting an undercarriage to said aeroplane, an undercarriage frame mounted on said means and adapted to rock on a lateral axis on said means, two wheels mounted in tandem fore and aft in said frame, means adapted to permit angular adjustment of said fore wheel, means for angularly adjusting said fore wheel to steer said aeroplane, and means distant from said lateral axis adapted resiliently to check the rocking movement of said frame.

10. In combination, an aeroplane having a rudder and control mechanism for said rudder, means connecting an undercarriage to said aeroplane, an undercarriage frame mounted on said means and adapted to rock on a lateral axis on said means, two wheels mounted in tandem fore and aft in said frame, means adapted to permit angular adjustment of said fore wheel, steering means for angularly adjusting said fore wheel to steer said aeroplane, and a coupling between said rudder control mechanism and said steering means.

11. In combination, an aeroplane having a rudder and control mechanism for said rudder, means connecting an undercarriage to said aeroplane, an undercarriage frame mounted on said means and adapted to rock on a lateral axis on said means, two wheels mounted in tandem fore and aft in said frame, means adapted to permit angular adjustment of said fore wheel, steering means for angularly adjusting said fore wheel to steer said aeroplane, a coupling between said rudder control mechanism and said steering means adapted to cause said steering means to be operated by said rudder control mechanism, and means for disengaging said coupling.

12. In combination, an aeroplane having a rudder and control mechanism for said rudder, means connecting an undercarriage to said aeroplane, an undercarriage frame mounted on said means and adapted to rock on a lateral axis on said means, two wheels mounted in tandem fore and aft in said frame, means adapted to permit angular adjustment of said fore wheel, a yoke connected to said fore wheel and a steering column on said yoke and extending upwardly into the aeroplane for angularly adjusting said fore wheel to steer said aeroplane.

13. In combination, an aeroplane, a connecting member for connecting an undercarriage to said aeroplane, a crosshead having trunnion ends located on a lateral axis, an undercarriage frame having bearings adapted to mount said frame on said trunnion ends and to permit it to rock on said lateral axis, two wheels mounted in tandem fore and aft in said frame, means adapted to permit angular adjustment of said fore wheel, and means for angularly adjusting said fore wheel to steer said aeroplane.

14. In combination, an aeroplane, a connecting member for connecting an undercarriage to said aeroplane having upper and lower parts telescopically mounted one within the other, a pivot for mounting said upper part to the aircraft body, a guide for said lower part, means for resiliently restraining relative movement of said upper and lower parts, a crosshead fixed on said lower part and having trunnion ends located on a lateral axis, an undercarriage frame having bearings adapted to mount said frame on said trunnion ends and to permit it to rock on said lateral axis, two wheels mounted in tandem fore and aft in said frame, means adapted to permit angular adjustment of said fore wheel, and means for angularly adjusting said fore wheel to steer said aeroplane.

15. Undercarriage for aircraft comprising two wheels arranged in tandem, a longitudinal frame carrying said wheels, means adapted to permit angular adjustment of both of said wheels in said frame, means for angularly adjusting said adjustable wheels to steer said frame, and means for connecting said frame to the aircraft on a lateral axis located between said wheels, such axis being adapted to permit of a rocking movement of said frame.

16. In combination, an aeroplane, means connecting an undercarriage to said aeroplane, an undercarriage frame mounted on said means and adapted to rock on a lateral axis on said means, two wheels mounted in tandem fore and aft in said frame, means adapted to permit angular adjustment of both of said wheels and means for angularly adjusting said wheels to steer said aeroplane.

17. Undercarriage for aircraft comprising two wheels arranged in tandem, a longitudinal frame carrying said wheels, means adapted to permit angular adjustment of one of said wheels in said frame, means for angularly adjusting said adjustable wheel to steer said frame, means for connecting said frame to the aircraft on a lateral axis located between said wheels, such axis being adapted to permit of a rocking movement of said frame, and means distant from said lateral axis adapted rigidly to check the rocking movement of said frame.

18. In combination, an aeroplane, means connecting an undercarriage to said aeroplane, an undercarriage frame mounted on said means and adapted to rock on a lateral axis on said means, two wheels mounted in tandem fore and aft in said frame, means adapted to permit angular adjustment of said fore wheel, means for angularly adjusting said fore wheel to steer said aeroplane, and means distant from said lateral axis adapted rigidly to check the rocking movement of said frame.

In witness whereof I have hereunto set my hand.

GEOFFREY TERENCE ROLAND HILL.